United States Patent [19]
Westlund

[11] Patent Number: 4,981,163
[45] Date of Patent: Jan. 1, 1991

[54] ASSEMBLY INTENDED FOR TREE LOGGING MACHINES

[76] Inventor: Hans Westlund, Tygelvägen 1, Sundsvall, Sweden, 852 58

[21] Appl. No.: 424,319
[22] PCT Filed: Jun. 17, 1988
[86] PCT No.: PCT/SE88/00338
 § 371 Date: Dec. 11, 1988
 § 102(e) Date: Dec. 11, 1988
[87] PCT Pub. No.: WO88/10065
 PCT Pub. Date: Dec. 29, 1988

[30] Foreign Application Priority Data
Jun. 18, 1987 [SE] Sweden .................. 8702549

[51] Int. Cl.$^5$ .............................. A01G 23/08
[52] U.S. Cl. ..................... 144/3 D; 144/2 Z; 144/338; 144/343
[58] Field of Search .............. 144/2 Z, 3 D, 338, 343; 30/379.5; 83/928

[56] References Cited

U.S. PATENT DOCUMENTS

| | | | |
|---|---|---|---|
| 3,720,246 | 3/1973 | David | 144/2 Z |
| 3,735,786 | 5/1973 | Vit | 144/338 |
| 3,796,241 | 3/1974 | Golob et al. | 144/2 Z |
| 3,850,469 | 11/1974 | Vit . | |
| 3,999,582 | 12/1976 | Allen et al. | 144/2 Z |
| 4,416,311 | 11/1983 | Murdoch et al. | 144/2 Z |
| 4,779,654 | 10/1988 | Casperson et al. | 144/2 Z |

FOREIGN PATENT DOCUMENTS

| | | | |
|---|---|---|---|
| 1070221 | 1/1980 | Canada . | |
| 0154615 | 9/1985 | European Pat. Off. . | |
| 2606179 | 2/1976 | Fed. Rep. of Germany | 144/2 Z |
| 3426127 | 2/1984 | Fed. Rep. of Germany . | |
| 3524570 | 1/1986 | Fed. Rep. of Germany . | |
| 8706794 | 11/1987 | PCT Int'l Appl. . | |
| 1055649 | 11/1983 | U.S.S.R. | 144/2 Z |

*Primary Examiner*—W. Donald Bray
*Attorney, Agent, or Firm*—Dowell & Dowell

[57] ABSTRACT

An assembly for use with tree logging or cutting machines of the loader, forwarder type, etc., which are provided with a crane. The assembly is intended to be mounted on the boom or jib of the crane and includes a gripper (10;76) for gripping around a tree trunk during tree felling, delimbing and loading operation. A saw (24;78) is provided for felling the tree and slashing the trunk to length. Delimbing tool (40;80) having knives (44;46;50) which embrace the tree and delimb the same. The delimbing tool and the gripper (10;76) are movable relative to each other so as to delimb the tree and to move the trunk.

11 Claims, 2 Drawing Sheets

ASSEMBLY INTENDED FOR TREE LOGGING MACHINES

BACKGROUND OF THE INVENTION

1. Field of the Invention

The present invention relates to a supplementary assembly for tree logging or cutting machines, which is intended to be fitted to the boom, jib or like member of a crane mounted on the machine and which includes a gripping member.

2. History of the Related Art

When trees are felled on a large scale, there is used normally a harvester by means of which the trees are felled, delimbed and slashed, whereafter the thus processed trees are loaded onto a further machine, a so-called forwarder, and moved from the tree cutting site to the nearest access road.

When cutting or felling trees on a smaller scale using only one machine, for instance in forest thinning operations, the trees are normally left on the tree cutting site, after being felled and delimbed, possibly to be loaded up and carried away at a later date. This method creates a problem, since the comprehensive work entailed in shifting the logs, wood, etc., at a later date makes such handling complicated and more expensive, or requires the inclusion of an additional machine, as in the case of large scale tree logging operations, in order to be able to manage the task of transporting away the logs. This latter alternative is not economically viable in the case of forest thinning operations for example. If the logs are left for future transportation, further problems may arise. For instance, the task of loading and transporting the logs may be made more difficult by the fact that snow has fallen whilst the wood has been left lying on the ground.

SUMMARY OF THE INVENTION

Consequently, the main object of this invention is to provide a supplementary assembly which when fitted to a machine equipped with a crane boom, e.g. a harvester, will enable all operations that are included in tree logging or cutting work, i.e. felling, processing, loading and transporting the logs to the nearest access road, to be carried out by one and the same machine.

This and other objects of the invention are achieved with an assembly which has the characterizing features set forth in the following claims.

BRIEF DESCRIPTION OF THE DRAWINGS

The inventive assembly will now be described in more detail with reference to embodiments thereof illustrated in the accompanying drawings.

DESCRIPTION OF THE PREFERRED EMBODIMENT

Figure 1:
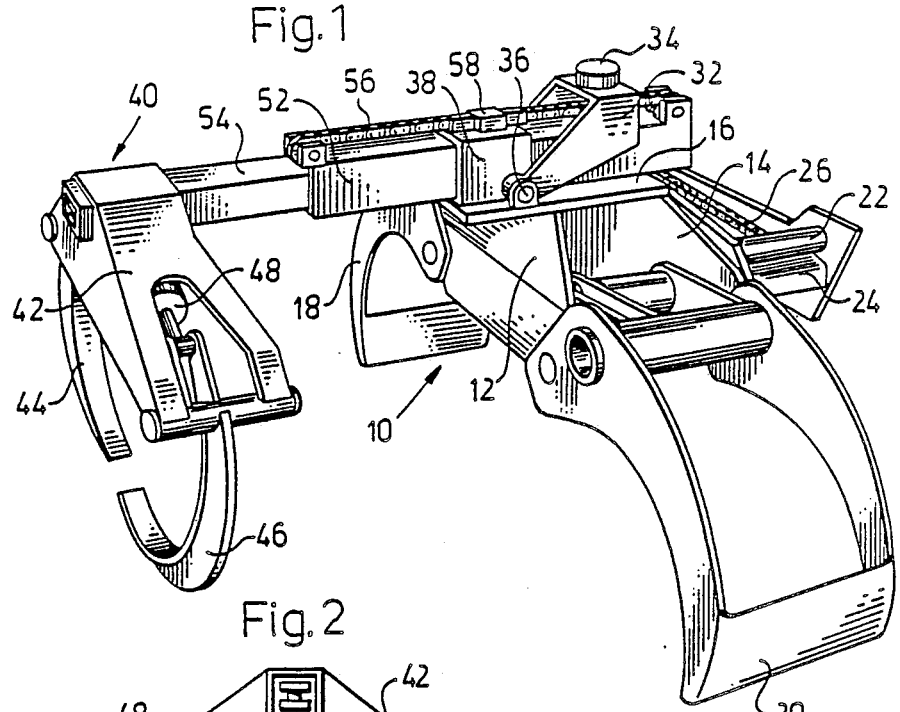
FIG. 1 is a perspective view of a complementary assembly constructed in accordance with the invention.

In the FIG. 1 illustration of the inventive assembly the reference 10 designates the head of a gripper of a known kind which is mounted on the end of the boom or jib of a crane and used for wood or log loading purposes. The gripper head 10 comprises two triangular side plates 12,14 and an intermediate cross-piece 16. Pivotally mounted on the head 10 are two claws 18,20 which can be opened or closed around the trunk of a tree with the aid of a hydraulic piston-cylinder device (not shown) connected between the claws by means of a linkage system. A motorized saw 24 equipped with a saw chain 26 and driven, e.g., by a hydraulic motor, is pivotally mounted to the side-piece 14 by means of a pivot journal 22. As will be seen from FIG. 3, the saw 24 can be swung down to a tree felling and/or trunk logging position, shown in chain lines, with the aid of a hydraulic piston-cylinder device 28 journalled between one end of the saw 24 and the side-piece 14, by retracting the piston rod of the piston-cylinder device, as described hereinafter. Pivotally mounted on the cross-piece 16 of the gripper 10 is an attachment 32 which has a connector 34 for the connection of the outer end of a crane mounted on a tree logging machine, such as a forwarder. The cross-piece of the gripper 10, and therewith the whole of the assembly, can be swung about a pivot axis 36 through an angle of at least 90°, by means of a hydraulic piston-cylinder device (not shown) or some other form of activator, such as to enable the assembly to be swung from a substantially vertical tree-felling position to the illustrated horizontal tree-processing position.

In accordance with the invention, tree-processing is commenced by attaching to the cross-piece 16 of the gripper 10 a bearing housing 38 for a delimbing tool or unit 40 which is mounted for axial movement in relation to the gripper. The unit 40 includes a triangular frame 42 (FIG. 2) composed of bars of inverse U-shaped configuration. Pivotally mounted on the lower ends of said frame are two knives 44,46 which can be swung towards and away from each other, by means of a hydraulic piston cylinder device 48. The mutually facing sides of the knives 44,46 present substantially semi-circular edge surfaces and, together with a rigidly mounted knife 50 which has a fixed, substantially inverted V-shaped knife cutter, are intended to substantially embrace a tree trunk in order to delimb or move the trunk, as described in more detail hereinafter. It will be understood that the stationary knife 50 may also have a part-circular cutter or edge. An essential feature for satisfactory functioning of the assembly is that both the stationary knife 50 and the movable knives 44,46 will lie well outside the working path or working region of the gripper claws 18,20, when said claws are operative in moving or loading tree trunks. This is ensured, by constructing the assembly so that the knives can be swung by the piston-cylinder device 48 to a position in which the knives 44,46 lie substantially parallel with the bottom edge of the casing 42 and above the stationary knife 50.

In the case of the illustrated embodiment, the means for extending or pushing out the delimbing unit 40 comprises a hollow beam 52, which is mounted for axial displacement in the bearing housing 38, and a further beam 54 which is mounted for axial displacement in the hollow beam 52, so as to provide a double-extension facility. Connected between the rear end of the hollow beam 52 and the end of the beam 54 located therein is a hydraulic piston-cylinder device or like activator (not shown) which is located within the hollow beam 52 and which is effective in moving the beam 54 axially, out, of the hollow beam 52. Axial displacement of the beam 52 in the bearing housing 38 on the gripper is effected by means of a chain 56 which is connected to the piston rod and which extends over sprocket wheels on respective ends of the beam 52 and is firmly attached to the upper side of the bearing housing by locking means 58. Consequently, at the same time as the piston rod of the piston-cylinder device moves the beam 54 out of the hollow beam 52, the beam 52 will also be displaced axially in the bearing housing 38, in the same direction in relation to the gripper 10, with the assistance of the chain 56. Naturally, the assembly can be provided with solely a single-extension facility, so as to simplify the construction and render it less expensive, if so desired.

The illustrated and described assembly has the following modus operandi. The assembly is moved forward to the tree to be felled, with the aid of the crane to which the assembly is attached via the connector or attachment 34, and is swung around the pivot axis 36 to a vertical position in which the gripper claws 18,20 are able to grip around the trunk of the tree, adjacent its root. The tree is then sawn through with the aid of the saw 24 and lifted with the aid of the crane to a horizontal position, preferably parallel with the longitudinal axis of the machine which carries the crane, normally a so-called forwarder, and onto which the logs, are to be loaded. The tree is then delimbed with the aid of delimbing tool or unit 40, which is linearly displaceable relative to the gripper, preferably as the tool is moved away from the gripper. During this operation, the two knives 44,46 of the delimbing tool 40 embrace the trunk with a certain degree of clearance therebetween, while the gripper claws 18,20 hold the trunk firm. When the tool 40 has been moved to the extent of its travel permitted by the beams 52,54 the grip of the gripper on the trunk is loosened, whereas the knives 44,46 are pressed harder against the trunk, so as to hold the trunk firm. When the tool 40 is withdrawn in towards the gripper, the trunk will therefore be moved between the claws 18,20 along the length of stroke of the tool 40. The gripper is then again used to hold firm the trunk, while the delimbing tool 40 carries out a further working stroke and delimbs a further length of the felled tree. This alternate holding of the tree with the gripper and the tool enables the whole tree to be delimbed solely with the aid of the illustrated assembly. During this sequence of operations, the machine operator is able to cut the trunk into logs of appropriate lengths with the aid of the saw 24, these logs then being loaded onto the machine with the aid of the gripper. The knives 44,46 are therewith swung up to their upper position as before described, as is also the saw 24, while at the same time retracting the beam 54 into the hollow beam 52 and displacing the beam 52 axially in the bearing housing 38 to the rearmost terminal position of the beam. In this way there is obtained a very compact, collapsed assembly which can be used as a conventional gripper loader without impediment from the remaining assembly components, knives 44,46 and saw 24 included in the inventive supplementary assembly. The gripper claws 18,20 can grip freely around tree trunks and handle such trunks, e.g. move or load the same, without being obstructed in any way.

Figure 4:
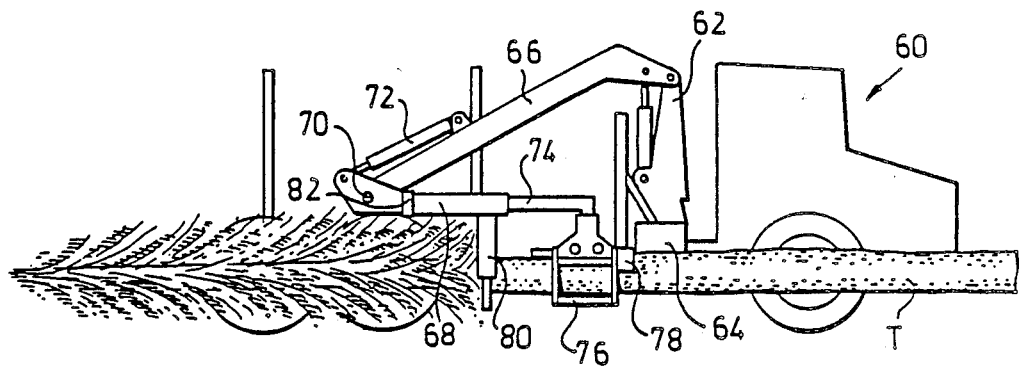
FIG. 4 is a side view of a tree logging machine equipped with another embodiment of the inventive assembly.
Figure 5:
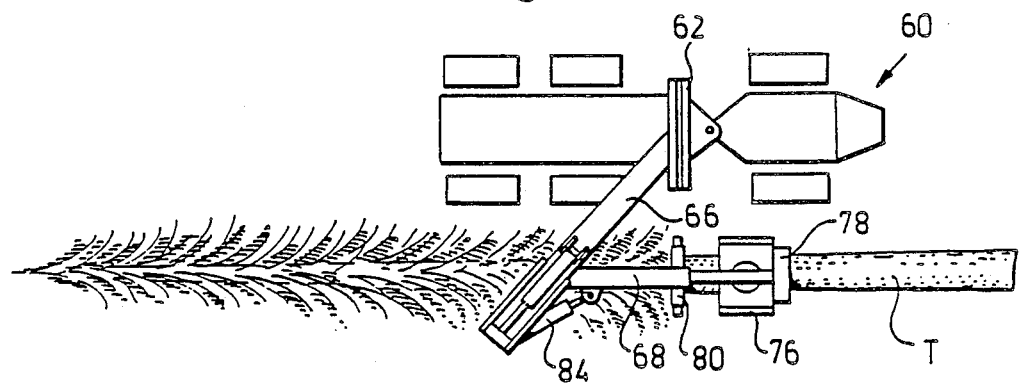
FIG. 5 is a plan view of the machine illustrated in FIG. 4.

In the case of the embodiment illustrated in FIGS. 4 and 5, the reference 60 designates a tree logging or cutting machine, a so-called forwarder, which is equipped with a crane 62 which is pivotally mounted on a bracket structure 64 on the machine 60, in a conventional manner. The crane 62 has, conventionally, a boom 66 and a crane jib 68, which latter is pivotally connected to the boom 66 by means of a pivot pin 70 and activated by a hydraulic piston cylinder device 72. The jib 68 carries a jib extension 74 which can be displaced axially inwardly and outwardly in relation to the jib and which carries at its outer end a gripper 76 with motor saw cassette 78, e.g. of the same kind as that described with reference to FIG. 1. A delimbing tool 80, substantially of the same construction as the tool 40 of the FIG. 1 embodiment, is attached to the jib 68, adjacent the outer end thereof. In order to enable the gripper 76 together with a tree trunk T held therein to be brought to a position parallel with the machine, therewith to enable processing of the tree, the jib 68 is fitted with a pivot pin 82 which will enable the jib to be swung relative to its attachment in the boom 66. The jib is swung with the aid of a piston-cylinder device mounted between the attachment and the jib 68.

Figure 2:
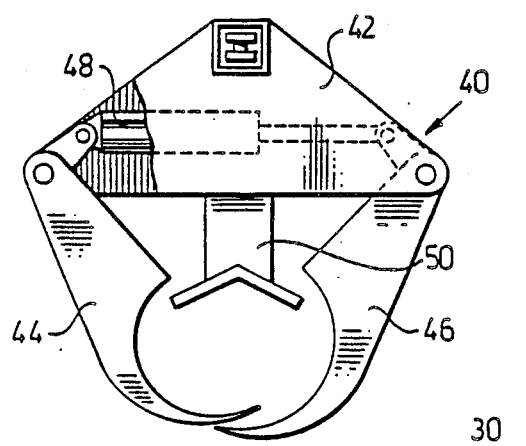
FIG. 2 is a view from the left side of the assembly in FIG. 1.
Figure 3:
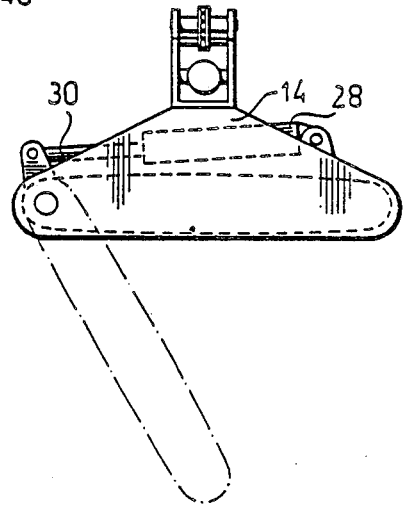
FIG. 3 is a view from the right side of the assembly in FIG. 1.

The manner of operation of the assembly illustrated in FIGS. 4 and 5 is such that the trunk is moved to the right, as seen in the Figures, with the aid of the gripper 76, wherewith the trunk is delimbed by the knives of the delimbing tool 80, similar to the manner described with reference to the embodiment of FIGS. 1-3. When the jib extension has been extended to its maximum, the grip of the gripper 76 around the trunk is loosened and the trunk T is held firm instead by the knives of the delimbing tool 80, whereas the gripper 76 is moved to the left in the Figures, by drawing in the jib extension 74. The tree trunk T in this case is also processed by alternate action between gripper 76 and delimbing tool 80. The trunk T can be cut into logs of appropriate lengths with the aid of the motor saw 78 and the logs subsequently loaded onto the forwarder 60 with the aid of the gripper. Thus, the delimbing tool 4, 80 of both of the embodiments illustrated respectively in FIGS. 1 to 3 and 4-5 is used to move the trunk back for the next working stroke. The tool can therewith be moved to one side, to enable the logs or wood to be loaded with the aid of the gripper 10; 76, by extending the piston rod of the piston-cylinder device 48 so that the knives 44,46 are folded up to a position in which they lie substantially completely within the confines of the frame 42, which is then withdrawn to a position adjacent the gripper 10;76. The frame will therewith lie above the pivot axes of the claws 18,20, and therewith out of the working range of the gripper.

It will be understood from the aforegoing that the present invention provides an assembly which is light in weight and which can be used to cut, delimb and load trees, e.g. in forest thinning operations, for transportation of the logs or wood to the nearest access road, by means of the same machine as that used to fell and process the trees.

It will be understood that the invention is not restricted to the illustrated and described embodiments, since modifications can be made thereto within the scope of the following claims.

What is claimed is:

1. An implement for tree cutting and logging machines which includes a crane having a boom comprising, a gripper means having a head portion and a pair of opposing jaws pivotally mounted to said head portion, said head portion having opposite sides which are connected by a cross piece, said opposing jaws being pivotal relative to an axis, a delimbing means including a frame means having a pair of knife means pivotally mounted thereto, means for pivoting said knife means between a first position wherein said knife means are opposing each other about said axis and a retracted position wherein said knife means are pivoted substantially within said frame means, first mounting means for connecting one of said gripper means and said delimbing means to the crane boom, and second mounting means for movably mounting the other of said gripper means and said delimbing means generally parallel to said axis for movement to and from said one of said gripper means and said delimbing means.

2. The implement of claim 1 in which said first mounting means includes a jib means pivotally mounted to the boom, said delimbing means being mounted to said jib means, said second mounting means including a jib extension which is movable outwardly in alignment with respect to said jib means and said gripper means being mounted to said jib extension.

3. The implement of claim 2 in which said delimbing means includes a stationary knife means mounted to said frame means and extending outwardly therefrom, said stationary knife means being positioned intermediate said pivotally mounted knife means.

4. The implement of claim 3 in which said pivotally mounted knife means include generally arcuately shaped cutting edges.

5. The implement of claim 3 in which said frame means is spaced from said axis at a distance which is greater than the distance at which said opposing jaws may be pivoted with respect to said axis.

6. The implement of claim 1 including a saw means pivotally mounted to one of said opposite sides of said head portion of said gripper means, and means for pivotally moving said saw means from a first position adjacent one of said opposite sides of said head portion to a second position which is spaced outwardly with respect to said head portion so that said saw means passes through said axis.

7. The implement of claim 1 in which said second mounting means includes an extension beam means having a first portion connected to said head portion of said gripper means and a second portion connected to said frame means of said delimbing means, and means for extending and retracting said beam means so as to move said delimbing means longitudinally relative to said axis.

8. The implement of claim 7 in which said frame means is spaced from said axis at a distance which is greater than the distance said opposing jaws of said gripper means are movable outwardly with respect to said axis whereby said frame means will not interfere with movement of said gripper means when said knife means are pivoted within said frame means.

9. The implement of claim 8 including a stationary knife means mounted to said frame means, said stationary knife means extending intermediate said pivotally mounted knife means.

10. The implement of claim 9 in which said first portion of said extension beam means includes a hollow beam mounted to said head portion of said gripper means, and said second portion of said extension beam means includes a secondary beam means which is movable axially outwardly with respect to said hollow beam.

11. The implement of any one of claims 7–10 in which said first mounting means includes pivot means to permit said head portion of said gripper means to be pivoted with respect to the boom.

* * * * *